United States Patent
Colby

(10) Patent No.: US 10,119,833 B2
(45) Date of Patent: Nov. 6, 2018

(54) PROJECTED SYNTHETIC VISION

(71) Applicant: Lockheed Martin Corporation, Bethesda, MD (US)

(72) Inventor: Steven D. Colby, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 318 days.

(21) Appl. No.: 15/179,270

(22) Filed: Jun. 10, 2016

(65) Prior Publication Data

US 2017/0059354 A1    Mar. 2, 2017

Related U.S. Application Data

(63) Continuation of application No. 14/187,533, filed on Feb. 24, 2014, now Pat. No. 9,366,546.

(51) Int. Cl.
*G01C 23/00*    (2006.01)
*G08G 5/00*    (2006.01)
*G08G 1/0962*    (2006.01)

(52) U.S. Cl.
CPC ......... *G01C 23/00* (2013.01); *G08G 1/09626* (2013.01); *G08G 5/0021* (2013.01); *G08G 5/0052* (2013.01); *G08G 5/0086* (2013.01)

(58) Field of Classification Search
CPC ........ G01C 23/00; G01C 21/00; G01C 21/36; G01S 19/42; G08G 5/00
USPC ...................................................... 701/431
See application file for complete search history.

(56) References Cited

U.S. PATENT DOCUMENTS

| | | | |
|---|---|---|---|
| 4,348,186 A | 9/1982 | Harvey et al. | |
| 5,296,854 A | 3/1994 | Hamilton et al. | |
| 5,486,821 A | 1/1996 | Stevens et al. | |
| 5,566,073 A | 10/1996 | Margolin | |
| 5,920,321 A | 7/1999 | Owen et al. | |
| 6,285,926 B1 | 9/2001 | Weiler et al. | |
| 6,421,603 B1 | 7/2002 | Pratt et al. | |
| 6,486,799 B1 | 11/2002 | Still et al. | |

(Continued)

FOREIGN PATENT DOCUMENTS

| CA | 2809951 A1 | 12/2013 |
|---|---|---|
| EP | 0 467 328 A2 | 7/1991 |

(Continued)

OTHER PUBLICATIONS

Lif, Patrik et al., "Multimodal Threat Cueing in Simulated Combat Vehicle with Tactile Information Switching between Threat and Waypoint Indication", Swedish Defense Research Agency, Linkoping, Sweden, Human Interface, Part I, HCII, LNCS 6771, 2011, p. 454-461.

(Continued)

*Primary Examiner* — Tan Q Nguyen
(74) *Attorney, Agent, or Firm* — Miles & Stockbridge P.C.

(57) ABSTRACT

Projected synthetic vision methods, systems and computer readable media are disclosed. For example, a system can include one or more sensors, a terrain database, and a projected synthetic vision controller coupled to the one or more sensors and the terrain database, the projected synthetic vision controller configured to generate and project synthetic vision images based on aircraft position, terrain information and aviator boresight information. The system can also include one or more projectors coupled to the projected synthetic vision controller.

17 Claims, 4 Drawing Sheets

(56) References Cited

U.S. PATENT DOCUMENTS

| | | |
|---|---|---|
| 6,619,220 B1 | 9/2003 | Ducote |
| 7,010,398 B2 | 3/2006 | Wilkins et al. |
| 7,091,881 B2 | 8/2006 | Judge et al. |
| 7,289,906 B2 | 10/2007 | Van der Merwe et al. |
| 7,365,652 B2 | 4/2008 | Scherbarth |
| 7,603,209 B2 | 10/2009 | Dwyer et al. |
| 7,961,117 B1 | 6/2011 | Zimmerman et al. |
| 8,089,375 B1 | 1/2012 | Seah |
| 8,099,234 B1 * | 1/2012 | Frank .................. G01C 23/005 701/436 |
| 8,120,548 B1 | 2/2012 | Barber |
| 8,416,479 B2 | 4/2013 | Kroll et al. |
| 8,742,952 B1 * | 6/2014 | Bold .................... G08G 5/0078 340/435 |
| 9,201,567 B2 | 12/2015 | Schrauben |
| 9,366,546 B2 | 6/2016 | Colby |
| 9,726,486 B1 * | 8/2017 | Lahr ...................... G01C 11/00 |
| 2003/0127557 A1 | 7/2003 | Anderson et al. |
| 2003/0194683 A1 | 10/2003 | Vorst |
| 2003/0222887 A1 | 12/2003 | Wilkinson, Jr. et al. |
| 2004/0217883 A1 | 11/2004 | Judge et al. |
| 2005/0007386 A1 | 1/2005 | Berson et al. |
| 2005/0237226 A1 | 10/2005 | Judge et al. |
| 2006/0066459 A1 | 3/2006 | Burch et al. |
| 2006/0235581 A1 | 10/2006 | Petilllion |
| 2006/0238377 A1 | 10/2006 | Stiles et al. |
| 2007/0176794 A1 * | 8/2007 | Feyereisen ............ G01C 23/00 340/970 |
| 2007/0276706 A1 | 11/2007 | Dunsky |
| 2008/0077284 A1 | 3/2008 | Swope |
| 2008/0103639 A1 | 5/2008 | Troy et al. |
| 2008/0180351 A1 | 7/2008 | He |
| 2008/0243383 A1 | 10/2008 | Lin |
| 2008/0262664 A1 * | 10/2008 | Schnell ................. G01C 23/00 701/4 |
| 2009/0002220 A1 | 1/2009 | Lovberg et al. |
| 2009/0248224 A1 | 10/2009 | Tschannen |
| 2009/0302170 A1 | 12/2009 | Rozovski |
| 2010/0125412 A1 | 5/2010 | Suddreth et al. |
| 2010/0145610 A1 | 6/2010 | Bacabara et al. |
| 2010/0231705 A1 | 9/2010 | Yahav et al. |
| 2010/0266992 A1 | 10/2010 | Gregoire et al. |
| 2011/0199661 A1 | 8/2011 | Kreitmair-Steck et al. |
| 2012/0062491 A1 | 3/2012 | Coni et al. |
| 2012/0072056 A1 | 3/2012 | Hasan et al. |
| 2012/0099170 A1 | 4/2012 | Shikii et al. |
| 2012/0133529 A1 | 5/2012 | He |
| 2012/0299839 A1 | 11/2012 | Lu |
| 2013/0155093 A1 * | 6/2013 | He ........................ G01C 23/005 345/592 |
| 2013/0179010 A1 | 7/2013 | Samuthirapandian et al. |
| 2013/0214998 A1 | 8/2013 | Andes et al. |
| 2013/0226370 A1 | 8/2013 | Muensterer |
| 2014/0002280 A1 | 1/2014 | He |
| 2014/0214245 A1 * | 7/2014 | Baudson ................ B65D 45/00 701/14 |
| 2015/0169273 A1 | 6/2015 | Colby |
| 2015/0235560 A1 | 8/2015 | Enns et al. |
| 2015/0277561 A1 | 10/2015 | Colby |
| 2017/0096237 A1 | 4/2017 | Colby |

FOREIGN PATENT DOCUMENTS

| | | |
|---|---|---|
| EP | 2280381 A2 | 2/2011 |
| WO | WO 2013/070770 A1 | 5/2013 |
| WO | 2013118112 A1 | 8/2013 |

OTHER PUBLICATIONS

Cheung, Bob et al., "Using Tactile Cueing to Enhance Spatial Awareness under Degraded Visual Environment", Defense Research & Development Toronto, Canada, RTO-MP-HFM-181, Oct. 2009, pp. P11-1 to P11-10.

McGrath, Braden J., "Tactile Instrument for Aviation", Naval Aerospace Medical Research laboratory, Pensacola, Florida, Jul. 30, 2000, 94 pages.

"Annex B—In-Flight Studies With Tactile Displays", NATO, RTO-TR-HFM-162, Mar. 12, 2012, pp. B-1 to B-10.

International Search Report and Written Opinion in PCT/US15/16777 dated Dec. 8, 2015.

Nonfinal Office Action dated Dec. 9, 2015, in U.S. Appl. No. 14/107,518.

International Search Report and Written Opinion in PCT/US15/21960 dated Dec. 10, 2015.

Nonfinal Office Action dated Jun. 23, 2015, in U.S. Appl. No. 14/107,518.

Final Rejection dated Jul. 15, 2015, in U.S. Appl. No. 14/107,518.

International Search Report and Written Opinion in PCT/US2014/070446 dated Aug. 19, 2015.

Notice of Allowance dated Apr. 1, 2016, in U.S. Appl. No. 14/225,784.

Final Rejection dated Apr. 5, 2016, in U.S. Appl. No. 14/107,518.

Notice of Allowance dated Apr. 5, 2016, in U.S. Appl. No. 14/107,518.

Notice of Allowance in U.S. Appl. No. 14/107,518 dated Sep. 21, 2016.

International Preliminary Report on Patentability in PCT/US2015/016777 dated Sep. 9, 2016.

Nonfinal Office Action dated Aug. 20, 2015, in U.S. Appl. No. 14/187,533.

Final Rejection dated Nov. 17, 2015, in U.S. Appl. No. 14/187,533.

Notice of Allowance dated Feb. 16, 2016, in U.S. Appl. No. 14/187,533.

Extended European Search Report in European Patent Application No. 15791907 dated Apr. 25, 2017.

Supplementary European Search Report dated Nov. 2, 2017, in Application No. 15809092.8.

Non-Final Office Action dated Feb. 9, 2018, in U.S. Appl. No. 15/196,367.

European Office Action dated Apr. 19, 2018, in related European Application No. 14 883 087.0.

Non-Final Office Action dated Sep. 17, 2018, in U.S. Appl. No. 15/196,367.

* cited by examiner

PROJECTED SYNTHETIC VISION

Some implementations relate generally to display systems for aircraft and, more particularly, to methods, systems and computer readable media for projected synthetic vision.

Rotary wing aircraft (and tilt rotor aircraft such as the V-22 Osprey) are routinely required to approach and land at sites without navigation guidance and/or in limited visibility conditions. Often the topography, ground hazards, obstacles and weather in the area are unknown or changing. Upon arrival at a landing or hover site, the pilot typically makes critical judgments based on incomplete or inaccurate data in order to determine the proper procedure to approach and land. If the terrain condition is such that dust, snow, sand, or the like will be stirred by rotor downwash, the aircraft may become engulfed in a cloud of visually-restrictive material. This is commonly referred to as a degraded visual environment (DVE) or a "brownout/whiteout" situation.

Spatial disorientation in a DVE is a common cause of incidents according to some literature reviews, pilot interviews, and military incident reports. During approach to hover and landing, the pilot may manipulate the aircraft controls to conduct a constant deceleration of longitudinal velocity while coordinating a rate of descent to the ground (or hover point) in such a way as to arrive with little or no forward velocity and a low rate of descent. In these DVE situations, it may be helpful for a pilot to have a display showing a synthetic (or computer generated) image of what the exterior surroundings would like without the visual interference.

In a DVE, such as instrument meteorological conditions (IMC) or brownout/whiteout situations, a pilot may be denied his/her visual cues. Some implementations were conceived in light of the above-mentioned problems and limitations, among other things.

Some implementations can include a system having one or more sensors, a terrain database. The system can also include a projected synthetic vision controller coupled to the one or more sensors and the terrain database, the projected synthetic vision controller configured to generate and project synthetic vision images based on vehicle position, terrain information and vehicle operator boresight information, and one or more projectors coupled to the projected synthetic vision controller.

The vehicle can include an aircraft and the sensors can include one or more of a radar altimeter, an air data system, an inertial navigation system, a traffic alert and collision avoidance system, an Enhanced Ground Proximity Warning System (EGPWS)/Controlled Flight Into Terrain (CFIT) system, a Global Positioning System (GPS) receiver, a Differential Global Positioning System (DGPS) receiver, a microwave radar, a forward looking infrared (FLIR) camera, and/or a video camera. The terrain data can include one or more of natural terrain features, vegetation, and manmade structures.

The one or more projectors can be configured to display images onto a diffractive holographic member. The one or more projectors each correspond to a window of the vehicle. The vehicle can include one of a land vehicle, a surface water vessel, an underwater vessel, an aircraft and a spacecraft. The projected synthetic vision controller is configured to receive vehicle operator boresight information and to adjust generated synthetic vision images based on the vehicle operator boresight information.

Some implementations can include a system comprising one or more sensors and a projected synthetic vision system coupled to the one or more sensors (or information sources) and configured to selectively project an image (e.g., a diffractive holographic image) on an inside surface of one or more cockpit window surfaces.

Some implementations can include a system having one or more sensors, a terrain database, and a projected synthetic vision controller coupled to the one or more sensors and the terrain database, the projected synthetic vision controller configured to generate and project synthetic vision images based on aircraft position, terrain information and aviator boresight information. The system can also include one or more projectors coupled to the projected synthetic vision controller.

The sensors can include one or more of a radar altimeter, an air data system, an inertial navigation system, a traffic alert and collision avoidance system, an Enhanced Ground Proximity Warning System (EGPWS)/Controlled Flight Into Terrain (CFIT) system, a Global Positioning System (GPS) receiver, a Differential Global Positioning System (DGPS) receiver, a microwave radar, a forward looking infrared (FLIR) camera, and/or a video camera.

The terrain data can include one or more of natural terrain features, vegetation, and manmade structures. The one or more projectors can be configured to display images onto a diffractive holographic member. The one or more projectors can each correspond to a cockpit window of an aircraft. The aircraft can be a helicopter. The projected synthetic vision controller is configured to receive aviator boresight information and to adjust generated synthetic vision images based on the aviator boresight information.

Some implementations can include a method including obtaining, at a processor, position information from one or more sensors and retrieving, at the processor, terrain information from a terrain database based on the position information. The method can also include obtaining, at the processor, aviator boresight information. The method can further include generating, using the processor, one or more synthetic vision images based on the position information, terrain information and aviator boresight information. The method can also include projecting the one or more synthetic vision images, via one or more projectors, onto a diffractive holographic member of a corresponding aircraft window.

The one or more sensors can include one or more of a radar altimeter, an air data system, an inertial navigation system, a traffic alert and collision avoidance system, an Enhanced Ground Proximity Warning System (EGPWS)/ Controlled Flight Into Terrain (CFIT) system, a Global Positioning System (GPS) receiver, a Differential Global Positioning System (DGPS) receiver, a microwave radar, a forward looking infrared (FLIR) camera, and/or a video camera. The terrain data can include one or more of natural terrain features, vegetation, and manmade structures.

The one or more projectors can be configured to display images onto a diffractive holographic member. The one or more projectors can each correspond to a cockpit window of an aircraft. The aircraft can be a helicopter. The projected synthetic vision controller can be configured to adjust the generated synthetic vision images based on the aviator boresight information.

Some implementations can include a nontransitory computer readable medium having stored thereon software instructions that, when executed, cause a processor to perform operations. The operations can include obtaining, at a processor, position information from one or more sensors and retrieving, at the processor, terrain information from a terrain database based on the position information. The operations can also include obtaining, at the processor, aviator boresight information and generating, using the processor, one or more synthetic vision images based on the position information, terrain information and aviator boresight information. The operations can further include projecting the one or more synthetic vision images, via one or more projectors, onto a diffractive holographic member of a corresponding aircraft window.

The one or more sensors can include one or more of a radar altimeter, an air data system, an inertial navigation system, a traffic alert and collision avoidance system, an Enhanced Ground Proximity Warning System (EGPWS)/Controlled Flight Into Terrain (CFIT) system, a Global Positioning System (GPS) receiver, a Differential Global Positioning System (DGPS) receiver, a microwave radar, a forward looking infrared (FLIR) camera, and/or a video camera. The terrain data includes one or more of natural terrain features, vegetation, and manmade structures.

The one or more projectors can be configured to display images onto a diffractive holographic member. The one or more projectors can each correspond to a cockpit window of a helicopter. The projected synthetic vision controller is configured to adjust the generated synthetic vision images based on the aviator boresight information.

DETAILED DESCRIPTION

While examples are discussed in terms of aircraft, such as rotary wing aircraft, it will be appreciated that implementations can be configured for use with other vehicles. In general, an embodiment can be configured for use on land vehicles (e.g., cars, trucks, motorcycles, all terrain vehicles, hovercraft, trains, remote exploration vehicles, underground vehicles and the like), surface water vessels (e.g., boats, ships, personal watercraft and the like), underwater vessels (submarines, submersibles, remote operated vehicles (ROVs) and the like), aircraft (e.g., airplanes, helicopters, vertical takeoff and landing aircraft (VTOLs), short take off and landing (STOL) aircraft, lighter-than-air vessels, dirigibles, blimps, gliders, unmanned aerial vehicles (UAVs) and the like) and spacecraft (e.g., rockets, orbiters, space stations and the like).

Figure 1:
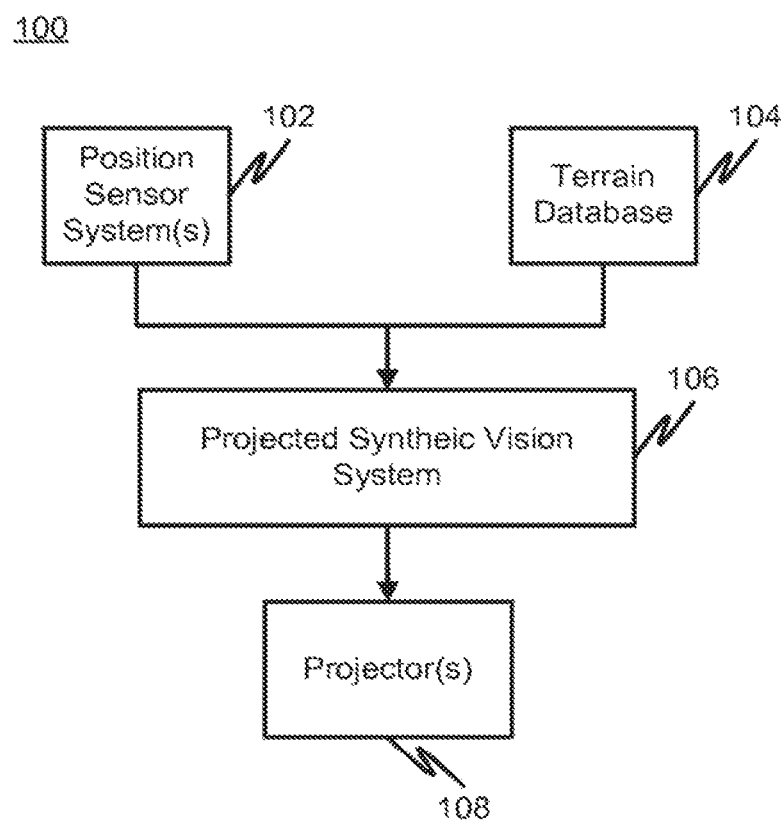
FIG. 1 shows a diagram of an example projected synthetic vision system in accordance with some implementations.

FIG. 1 shows a diagram of an example projected synthetic vision system in accordance with some implementations. The system 100 includes one or more position sensor systems 102, a terrain database 104, a projected synthetic vision system 106 and one or more projectors 108.

In operation, the position sensor systems 102 generate position information, which is transmitted to the projected synthetic vision system 106. The sensor systems 102 can include, for example, one or more of a radar altimeter, an air data system, an inertial navigation system, a traffic alert and collision avoidance system, an Enhanced Ground Proximity Warning System (EGPWS)/Controlled Flight Into Terrain (CFIT) system, a digital map, a terrain database, a Global Positioning System (GPS) receiver, a Differential Global Positioning System (DGPS) receiver, a microwave radar, a forward looking infrared (FLIR) camera, and/or a video camera. In addition to the above-mentioned example sensors, traditional avionics instruments (altimeter, vertical speed indicator, compass, air speed indicator or the like) could also be included in the sensor system 102.

The projected synthetic vision system 106 uses the received position information to determine the location and attitude of the aircraft. For example, the projected synthetic vision system 106 can use the location, altitude and/or attitude in one or more axes such as fore/aft, lateral, heading, altitude, yaw, pitch and/or roll along with terrain information from the terrain database 104 to generate a synthetic vision image. The generated synthetic vision image can be adjusted (or boresighted) to the pilot's eyesight level out of the cockpit. Thus, an implementation can include a boresighted projected synthetic vision display that provides an artificial visual reference that is congruous with the actual horizon and/or terrain location in the aviator's line of sight. This can permit better mental fusion of the subconscious with the cognitively processed information from the other flight displays.

The projected synthetic vision system 106 can send one or more synthetic vision images to one or more corresponding projectors 108. Each image can be generated according to which cockpit window the image will be displayed on and the image can then be sent to a projector corresponding to that window.

Figure 2:
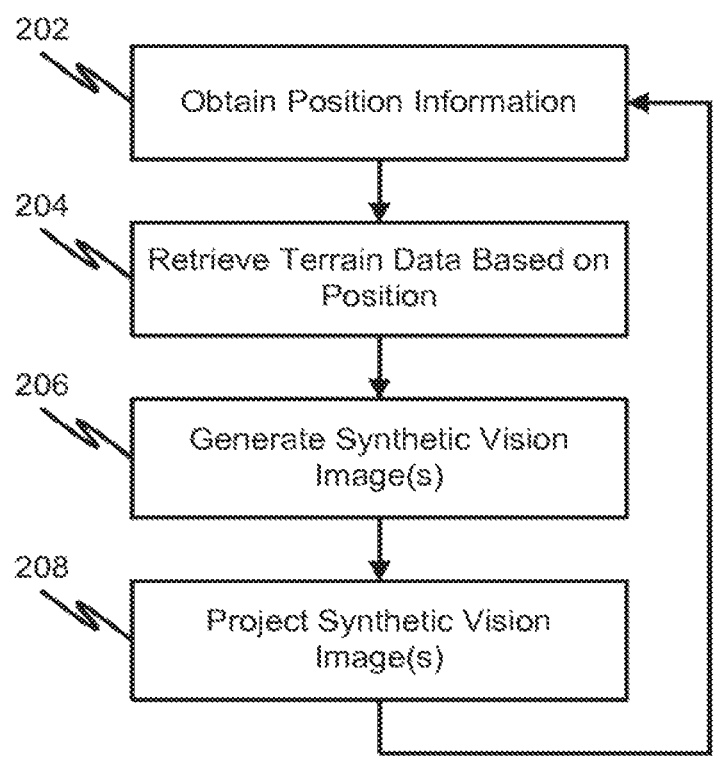
FIG. 2 shows a flow chart of an example method for projected synthetic vision in accordance with some implementations.

FIG. 2 shows a flow chart of an example method for projected synthetic vision in accordance with some implementations. Processing begins at 202, where position (or other) information is obtained. For example, position information from one or more sensors (e.g., 102) can be obtained by a projected synthetic vision system (e.g., 106). The information can include flight information such as location, velocity, height above ground, groundspeed, ground track, wind direction, wind speed, location of a landing/hover zone, location of other aircraft, aircraft performance, or the like. Processing continues to 204.

At 204, the system retrieves terrain data based on the position information obtained in step 202. For example, the system can retrieve terrain information for the portion of terrain that would be visible to an aviator in the aircraft cockpit. The terrain information can include natural terrain features (e.g., mountains or other land features, lakes, rivers, oceans or other water features), vegetation, and/or manmade structures (e.g., roads, buildings, bridges and the like). The terrain database can also include digital map data. The types of terrain information displayed in the synthetic vision images can be selected by an operator. Processing continues to 206.

At 206, the system generates one or more synthetic vision images. The synthetic vision images can be based on a combination of one or more of position/flight information, terrain database information and aviator line of sight/boresight information. Processing continues to 208.

At 208, the synthetic images are projected onto an interior surface of one or more corresponding aircraft windows. It will be appreciated that 202-208 can be repeated in whole or in part in order to accomplish a contemplated projected synthetic vision task.

Figure 3:
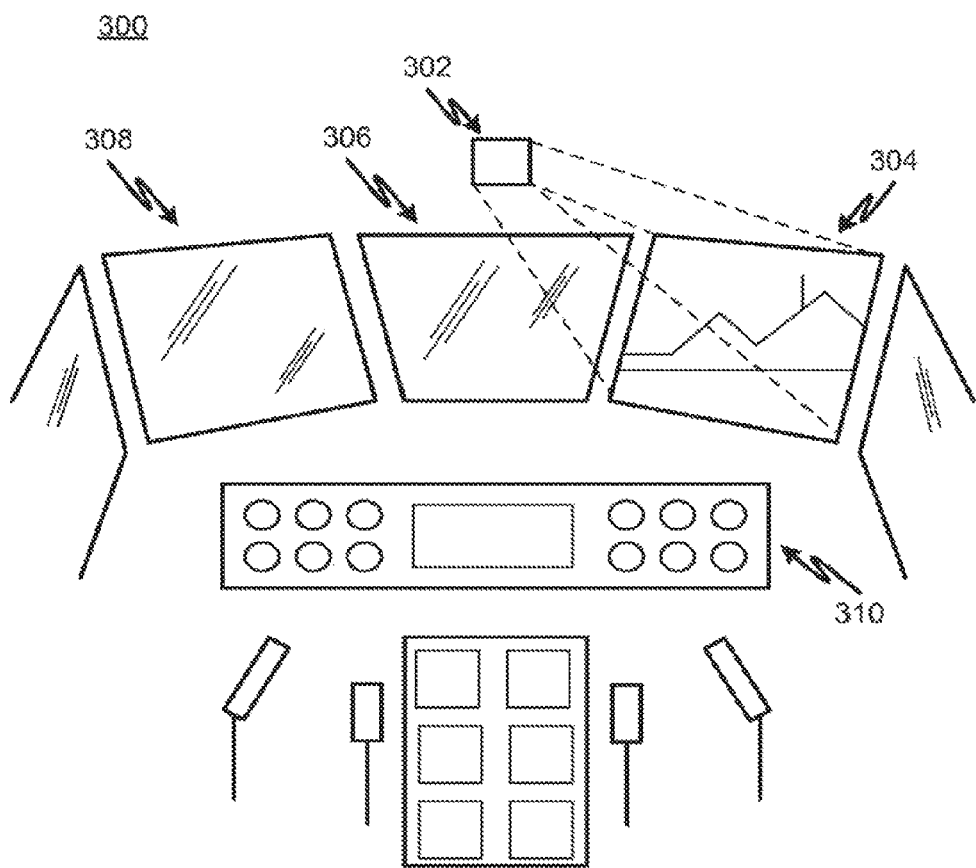
FIG. 3 is a diagram of an example aircraft cockpit including a projected synthetic vision system in accordance with some implementations.

FIG. 3 is a diagram of an example aircraft cockpit 300 having a projected synthetic vision system (e.g., 100) in accordance with some implementations. In particular, the cockpit 300 includes a projector 302 disposed so as to be able to project a synthetic vision image onto an interior surface of a corresponding window 304. It will be appreciated that the same projector 302 or different projectors (not shown) can be configured to project images onto other windows 306-308. The projected synthetic vision images can augment the avionics/instrument displays 310 in DVE situations or night flight operations.

The windows (304-308) can include diffractive holographic elements that permit an aviator to see through the window when the projected synthetic vision system is not in use and permit the synthetic vision images to become visible when the projected synthetic vision system is in use.

The projected synthetic vision system can be adapted for use on an aircraft including a fixed-wing aircraft, a rotary wing aircraft, a tilt rotor aircraft or the like.

Figure 4:
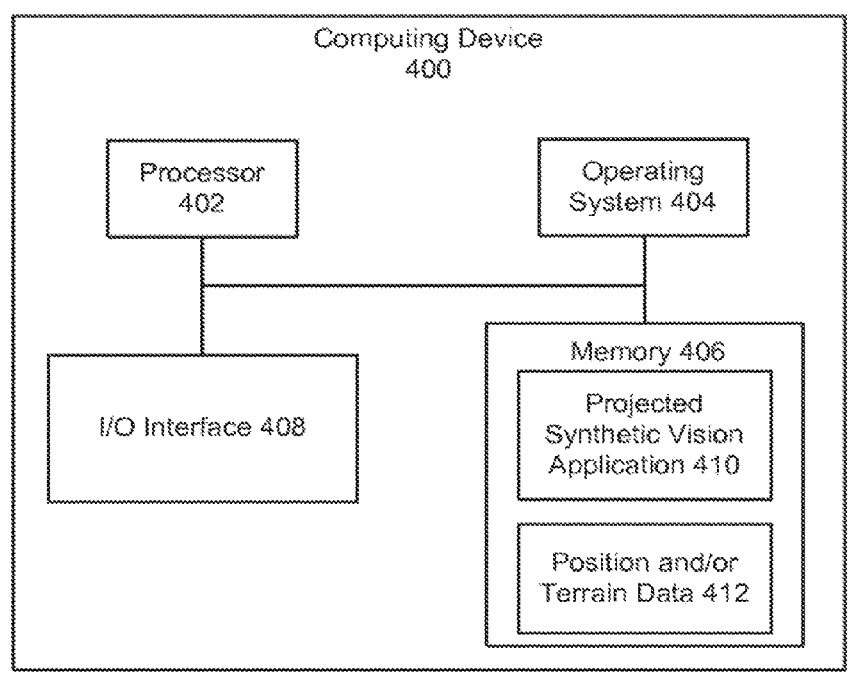
FIG. 4 is a diagram of an example computing system for projected synthetic vision in accordance with some implementations.

FIG. 4 is a diagram of an example computing device for synthetic vision projection in accordance with some implementations. The computing device 400 includes a processor 402, an operating system 404, a memory 406 and an I/O interface 408. The memory 406 can store a projected synthetic vision application 410 and position and/or terrain data 412.

In operation, the processor 402 may execute the projected synthetic vision application 410 stored in the memory 406. The projected synthetic vision application 410 can include software instructions that, when executed by the processor 402, cause the processor 402 to perform operations for projected synthetic vision in accordance with the present disclosure (e.g., the projected synthetic vision application 410 can cause the processor to perform one or more of steps 202-208 described). The projected synthetic vision application 410 can also operate in conjunction with the operating system 404.

The computer (e.g., 400) can include, but is not limited to, a single processor system, a multi-processor system (co-located or distributed), a cloud computing system, or a combination of the above.

A network can connect the sensors, the projected synthetic vision system and the indicators. The network can be a wired or wireless network, and can include, but is not limited to, an aircraft signal bus, a WiFi network, a local area network, a wide area network, the Internet, or a combination of the above.

The data storage, memory and/or nontransitory computer readable medium can be a magnetic storage device (hard disk drive or the like), optical storage device (CD, DVD or the like), electronic storage device (RAM, ROM, flash, or the like). The software instructions can also be contained in, and provided as, an electronic signal, for example in the form of software as a service (SaaS) delivered from a server (e.g., a distributed system and/or a cloud computing system).

Moreover, some implementations of the disclosed method, system, and computer readable media can be implemented in software (e.g., as a computer program product and/or nontransitory computer readable media having stored instructions for performing one or more projected synthetic vision tasks as described herein). The stored software instructions can be executed on a programmed general purpose computer, a special purpose computer, a microprocessor, or the like.

The computing device 400 can be a standalone computing device or a device incorporated in another system, such as an avionics system or flight computer.

It is, therefore, apparent that there is provided, in accordance with the various implementations disclosed herein, methods, systems and computer readable media for projected synthetic vision.

While the invention has been described in conjunction with a number of embodiments, it is evident that many alternatives, modifications and variations would be or are apparent to those of ordinary skill in the applicable arts. Accordingly, Applicant intends to embrace all such alternatives, modifications, equivalents and variations that are within the spirit and scope of the invention.

What is claimed is:

1. A system comprising:
   one or more sensors;
   a terrain database;
   a projected synthetic vision controller coupled to the one or more sensors and the terrain database, the projected synthetic vision controller configured to generate and project synthetic vision images based on vehicle position, terrain information and vehicle operator boresight information; and
   one or more projectors coupled to the projected synthetic vision controller, wherein the one or more projectors are configured to display images onto a diffractive holographic member on an interior surface of a vehicle window.

2. The system of claim 1, wherein the vehicle includes an aircraft and the sensors include one or more of a radar altimeter, an air data system, an inertial navigation system, a traffic alert and collision avoidance system, an Enhanced Ground Proximity Warning System (EGPWS)/Controlled Flight Into Terrain (CFIT) system, a Global Positioning System (GPS) receiver, a Differential Global Positioning System (DGPS) receiver, a microwave radar, a forward looking infrared (FLIR) camera, and/or a video camera.

3. The system of claim 1, wherein the terrain data includes one or more of natural terrain features, vegetation, and manmade structures.

4. The system of claim 1, wherein the one or more projectors each correspond to a window of the vehicle.

5. The system of claim 4, wherein the vehicle includes one of a land vehicle, a surface water vessel, an underwater vessel, an aircraft and a spacecraft.

6. The system of claim 4, wherein the projected synthetic vision controller is configured to receive vehicle operator boresight information and to adjust generated synthetic vision images based on the vehicle operator boresight information.

7. A method comprising:
   obtaining, at a processor, position information from one or more sensors;
   retrieving, at the processor, terrain information from a terrain database based on the position information;
   obtaining, at the processor, boresight information;
   generating, using the processor, one or more synthetic vision images based on the position information, terrain information and boresight information; and
   projecting the one or more synthetic vision images, via one or more projectors, onto a diffractive holographic member on a surface of a corresponding vehicle window.

8. The method of claim 7,
   wherein the one or more sensors include one or more of a radar altimeter, an air data system, an inertial navigation system, a traffic alert and collision avoidance system, an Enhanced Ground Proximity Warning System (EGPWS)/Controlled Flight Into Terrain (CFIT) system, a Global Positioning System (GPS) receiver, a Differential Global Positioning System (DGPS) receiver, a microwave radar, a forward looking infrared (FLIR) camera, and/or a video camera.

9. The method of claim 7, wherein the terrain data includes one or more of natural terrain features, vegetation, and manmade structures.

10. The method of claim 7, wherein the one or more projectors each correspond to a cockpit window of an aircraft.

11. The method of claim 10, wherein the vehicle is a helicopter.

12. The method of claim 7, wherein the projected synthetic vision controller is configured to adjust the generated synthetic vision images based on the boresight information.

13. A nontransitory computer readable medium having stored thereon software instructions that, when executed, cause a processor to perform operations including:

- obtaining, at a processor, position information from one or more sensors;
- retrieving, at the processor, terrain information from a terrain database based on the position information;
- obtaining, at the processor, boresight information;
- generating, using the processor, one or more synthetic vision images based on the position information, terrain information and boresight information; and
- projecting the one or more synthetic vision images, via one or more projectors, onto a diffractive holographic member on a surface of a corresponding vehicle window.

14. The nontransitory computer readable medium of claim 13, wherein the one or more sensors include one or more of a radar altimeter, an air data system, an inertial navigation system, a traffic alert and collision avoidance system, an Enhanced Ground Proximity Warning System (EGPWS)/Controlled Flight Into Terrain (CFIT) system, a Global Positioning System (GPS) receiver, a Differential Global Positioning System (DGPS) receiver, a microwave radar, a forward looking infrared (FLIR) camera, and/or a video camera.

15. The nontransitory computer readable medium of claim 13, wherein the terrain data includes one or more of natural terrain features, vegetation, and manmade structures.

16. The nontransitory computer readable medium of claim 13, wherein the one or more projectors each correspond to a cockpit window of a helicopter.

17. The nontransitory computer readable medium of claim 13, wherein the projected synthetic vision controller is configured to adjust the generated synthetic vision images based on the boresight information.

* * * * *